US010970734B2

(12) United States Patent
Chopra et al.

(10) Patent No.: US 10,970,734 B2
(45) Date of Patent: Apr. 6, 2021

(54) INTERACTIVE LOYALTY REWARD SYSTEM AND METHOD

(71) Applicant: Mastercard International Incorporated, Purchase, NY (US)

(72) Inventors: Rajesh Chopra, Haryana (IN); Juan Carlos Gonzalez, Great Neck, NY (US); Michael J. Cardamone, New Windsor, NY (US); Arun Elangovan, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 711 days.

(21) Appl. No.: 15/379,864

(22) Filed: Dec. 15, 2016

(65) Prior Publication Data

US 2018/0174180 A1  Jun. 21, 2018

(51) Int. Cl.
*G06Q 30/02* (2012.01)

(52) U.S. Cl.
CPC ..... *G06Q 30/0226* (2013.01); *G06Q 30/0238* (2013.01)

(58) Field of Classification Search
None
See application file for complete search history.

(56) References Cited

U.S. PATENT DOCUMENTS 8,287,383 B1 * 10/2012 Etter .................. H04L 67/38
463/42
8,777,754 B1 * 7/2014 Santini .................. G07F 17/32
463/42

(Continued)

FOREIGN PATENT DOCUMENTS

WO  WO-2006122044 A2 * 11/2006 ......... G06Q 30/0212

OTHER PUBLICATIONS

Rebecca Walker Reczek, "Lucky Loyalty: The Effect of Consumer Effort on Predictions of Randomly Determined Marketing Outcomes", Journal of Consumer Research, vol. 41, No. 4 (Dec. 2014), pp. 1065-1077 (Year: 2014).*

*Primary Examiner* — Christopher B Tokarczyk
(74) *Attorney, Agent, or Firm* — Leason Ellis LLP

(57) ABSTRACT

Systems and methods are provided for implementing an interactive loyalty reward program for transactions conducted at transaction terminals, for instance, consumer purchase transactions conducted at a point-of-sale terminal. The system includes a server configured to monitor and identify qualifying transactions under the reward program. The server also coordinates operation of consumer-facing devices accessible to the consumer at the point-of-sale. The consumer-facing devices include an interactive value generator (IVG), which is configured to provide a game-like experience to consumers and interactively generates unspecified reward values for qualifying transactions. A loyalty reward application executing on the transaction terminal is also provided to guide consumer interaction with the IVG and communicate the generated reward values to the server. The server is further configured to calculate loyalty reward amounts for respective transactions based on the generated reward values and prescribed terms of corresponding loyalty reward programs.

17 Claims, 3 Drawing Sheets

(56) References Cited

U.S. PATENT DOCUMENTS

| | | | |
|---|---|---|---|
| 2009/0117999 A1* | 5/2009 | Johnson | G07F 17/32 463/26 |
| 2013/0005475 A1* | 1/2013 | Mahajan | A63F 13/216 463/42 |
| 2013/0165230 A1* | 6/2013 | Thacker | G07F 17/3246 463/42 |
| 2013/0246273 A1* | 9/2013 | Ovick | G06Q 20/045 705/44 |
| 2014/0257961 A1* | 9/2014 | Zimmermann | G06Q 30/0231 705/14.31 |

* cited by examiner

INTERACTIVE LOYALTY REWARD SYSTEM AND METHOD

TECHNICAL FIELD OF THE DISCLOSURE

This patent application relates generally to the field of electronic transaction processing systems and, in particular, transaction processing systems configured to implement consumer rewards programs in connection with electronic payment transactions.

BACKGROUND OF THE DISCLOSURE

Transactions between a consumer and a merchant for the purchase of goods or services are often conducted at transaction computing devices and using some form of electronic payment. For example, the transaction computing devices used to complete payment can be point-of-sale (POS) devices located at a brick-and-mortar merchant location or a consumer's own personal computing device that is used to make an online purchase.

In such electronic payment transactions, a payment card or other such electronic payment device can be used. Examples of electronic payment devices include credit cards, debit cards, charge cards, gift cards and pre-paid cards, as well as other types of electronic devices such as NFC enabled key-fobs or mobile wallets. Such payment devices are uniquely tied to a consumer's or account-holder's transaction account and, typically, are backed by an issuing lending institution or bank. These lending institutions often have loyalty rewards programs that provide incentives to consumers or account-holders. The loyalty rewards programs designed to attract consumers to a specific transaction account program, and the incentives are provided to prompt customers to use their transaction accounts more frequently.

Loyalty rewards programs typically consist of paying a fixed percentage of one or more qualified sales back to the consumer or cardholder. The reward can be paid in the form of cash or non-cash units, and rewards are accumulated in association with each consumer's or account-holder's transaction account. Examples of incentives include cash, points, airline miles, gift certificates, coupons, etc. that accrue on the consumer's or cardholder's account. In some instances, consumers or account-holders can redeem these incentives and/or automatically receive a reward. For example, the loyalty reward can be cash-back in the form of a pre-paid card, or a credit amount that is applied to the transaction account.

The terms of loyalty rewards programs (e.g., return percentage, what constitutes a qualifying sale or sales, etc.) can vary widely, however, the respective terms are typically fixed for a given period. Thus, while existing loyalty rewards programs serve to attract consumers to specific payment card programs and incentivize use at the outset, these programs do little to further drive engagement and usage of transaction accounts at the point-of-sale.

Accordingly, additional loyalty-rewards incentives and features provided at the point-of-sale are desired in order to continually engage and prompt consumers to maintain their usage of payment accounts under the loyalty rewards program.

It is with respect to these and other considerations that the disclosure made herein is presented.

SUMMARY OF THE DISCLOSURE

Technologies are presented herein in support of a system and method for providing an interactive value reward program in connection with one or more transactions conducted by respective consumers at a point-of-sale.

According to a first aspect, a system for providing an unspecified value in connection with a transaction conducted at a transaction computing device is provided. The system comprises an interactive value generator that is provided at a particular transaction computing device. In particular, the interactive value generator is configured to pseudo-randomly generate values that are specified for respective transactions as a function of user interactions with the interactive value generator. The system also includes an application module that is enabled at a particular transaction computing device. The application module is communicatively coupled to a first computing device over a communication network and the application module configures the particular transaction computing device to guide user interaction with the interactive value generator. The system also includes a first computing device, which has a memory for storing one or more software modules comprising instructions in the form of code therein and a processor that is configured by executing the instructions. In particular, the one or more software modules include a transaction monitoring module that configures the processor to receive, from one or more transaction computing devices over a communication network, transaction data associated with respective transactions. The transaction monitoring module also configures the processor to monitor the transaction data for a qualifying transaction conducted at the particular transaction computing device by a registered user. The modules also include a coordinated operation module that configures the processor to, in response to the qualifying transaction and in conjunction with the application module, prompt the registered user to interact with the interactive value generator provided at the transaction computing device. The coordinated operation module also configures the processor to receive a specified value generated by the interactive value generator in response to the registered user's interaction. The modules also include an award module that configures the processor to calculate an award amount based on a default value and the specified value and cause the calculated award amount to be provided to the registered user.

According to another aspect, a system for providing an interactive loyalty reward program in connection with one or more financial transactions conducted by respective consumers using respective transaction computing devices is provided. The system comprises an interactive reward value generator that is provided at a particular transaction computing device and that is configured to generate an unspecified reward value as a function of consumer interactions therewith. The system also includes a loyalty reward application module that is enabled at a particular transaction computing device that is communicatively coupled to a first computing device over a communication network. Moreover, the loyalty reward application module configures the particular transaction computing device to guide consumer interaction with the interactive reward value generator pursuant to the interactive loyalty reward program. The system also includes the first computing device, which has a memory storing one or more software modules comprising instructions in the form of code and a processor that is configured by executing the instructions therein. In particular, the one or more software modules include a transaction monitoring module that configures the processor to receive, from one or more transaction computing devices over a communication network, financial transaction data associated with the one or more financial transactions and further configures the processor to monitor the financial transaction data for a qualifying transaction conducted by a registered consumer and using a particular transaction computing device. The one or more software modules also includes a coordinated operation module that configures the processor to, in response to the qualifying transaction and in conjunction with the loyalty reward application module, prompt the registered consumer to interact with the interactive reward value generator provided at the particular transaction computing device. In addition, the device coordination module further configures the processor to receive a specified reward value generated by the interactive reward value generator in response to the registered consumer's interaction. Furthermore, the one or more software modules includes a loyalty reward module that configures the processor to calculate a loyalty reward amount based on a default reward value and the specified reward value and cause the calculated loyalty reward amount to be provided to the registered customer.

According to another aspect, a computer-implemented method for providing an interactive loyalty reward program in connection with one or more financial transactions conducted by respective consumers using respective transaction computing devices. The method is implemented by a first computing device having a memory storing instructions in the form of code and a processor configured by executing the instructions therein. Moreover, the method comprises the steps of receiving, by the first computing device from one or more transaction computing devices over a communication network, financial transaction data associated with the one or more financial transactions and monitoring the financial transaction data for a qualifying transaction conducted by a registered consumer and using a particular transaction computing device. The method also includes the step of providing, at the particular transaction computing device, an interactive reward value generator that is configured to generate an unspecified reward value as a function of a consumer interaction therewith. Furthermore, the method includes the step of enabling at the particular transaction computing device, a loyalty reward application module. More specifically, the loyalty reward application module configures the particular transaction computing device to communicate with the first computing device over the communication network and to guide consumer interaction with the interactive reward value generator. The method also includes the step of prompting, using the loyalty reward application module in response to the qualifying transaction, the registered consumer to interact with the interactive reward value generator provided at the particular transaction computing device. In addition, the method includes the step of receiving, at the first computing device, a specified reward value generated by the interactive reward value generator in response to the registered consumer's interaction and then calculating a loyalty reward amount based on a default reward value and the received specified reward value. Moreover, the method includes the step of causing the calculated loyalty reward amount to be provided to the registered customer.

These and other aspects, features, and advantages can be appreciated from the accompanying description of certain embodiments of the invention and the accompanying drawing figures and claims.

DETAILED DESCRIPTION OF CERTAIN EMBODIMENTS OF THE DISCLOSURE

Figure 1:
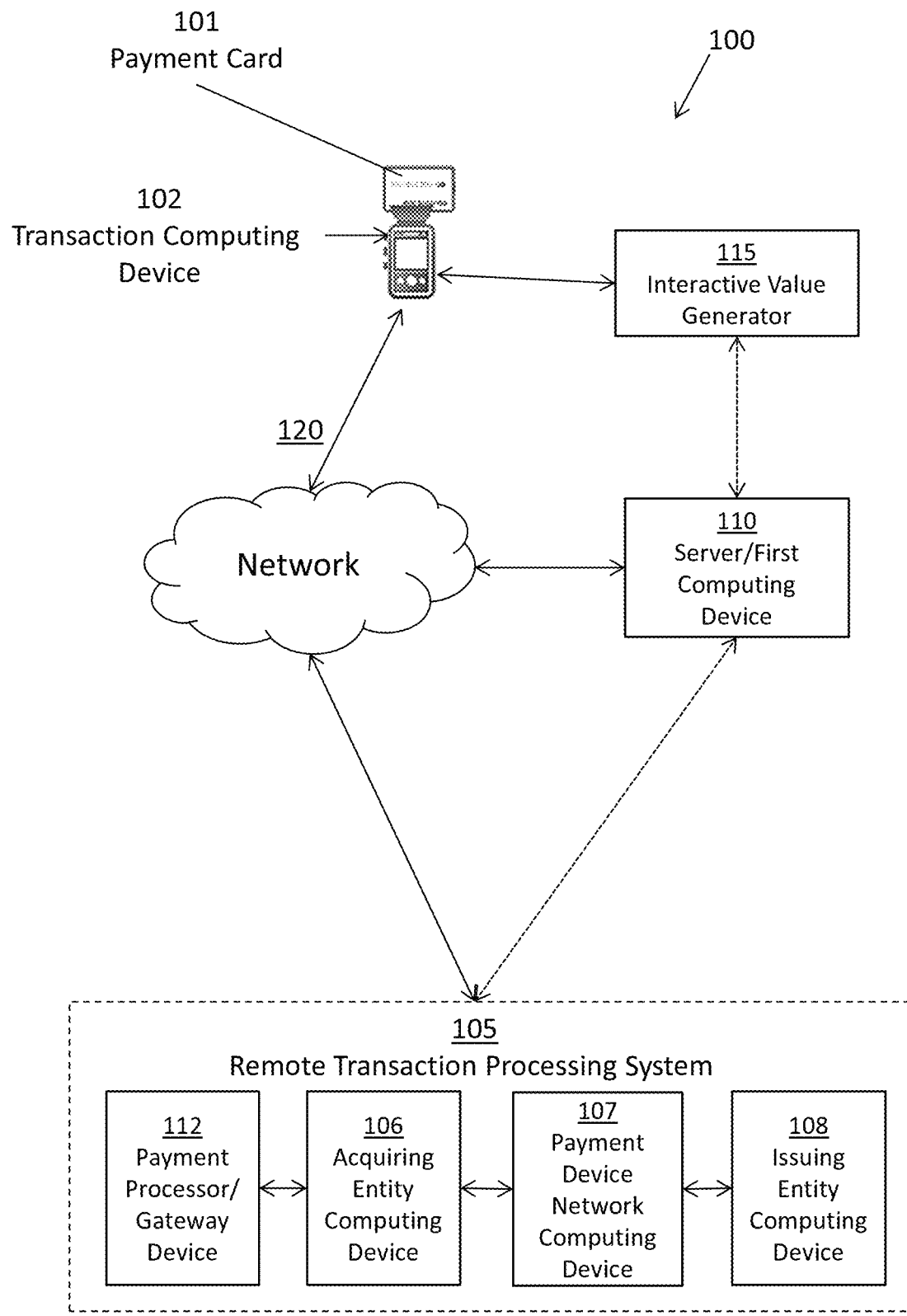
FIG. 1 is a high-level diagram illustrating computer system for providing an interactive loyalty reward program in accordance with certain embodiments of the invention.

By way of overview and introduction, various systems and methods are described herein that facilitate providing an interactive loyalty reward program for consumers conducting transactions at transaction computing devices. For example, the systems and methods are implemented in connection with electronic payment transactions, including, a consumer's purchase of goods or services from a merchant that is conducted electronically at a point-of-sale (POS) terminal. More specifically, the loyalty rewards system can include a back-end server component that is configured to monitor electronic transactions in near-real time and determine whether a transaction is a "qualifying transaction" under a loyalty reward program. If a qualifying transaction is identified, the server coordinates consumer interaction with one or more consumer-facing devices. In particular, the consumer can be prompted to interact with an interactive value generator that is provided at the transaction computing device that is being used to conduct the transaction. For instance, the interactive value generator can be a stand-alone device like a roulette-wheel or virtual roulette-wheel that the user can spin and, as a result, a specified reward can be value pseudo-randomly determined for the qualifying transaction. The loyalty rewards system can also include a loyalty reward application module executing on the transaction computing device that is configured to electronically transmit the specified reward to the back-end server. In addition, the back end server is further configured to calculate a loyalty reward amount for the transaction based on the received reward value and prescribed terms of a corresponding loyalty reward program.

Based on the consumer's interaction with the interactive value generator when completing a purchase transaction, the system generates a loyalty reward amount that can vary from one transaction to the next. The system thereby provides a uniquely interactive, dynamically random and fun transaction experience that engages the consumer in connection with each qualifying transaction and helps to encourage a desired user behavior.

The systems and methods for interactively providing rewards in connection with a transaction conducted at a transaction terminal are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below, which are merely exemplary of the various systems and methods, that can be embodied in various forms, as will be appreciated by one skilled in the art. Therefore, it is to be understood that any structural and functional details disclosed herein are not to be interpreted as limiting the systems and methods, but rather, are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

FIG. 1 is a schematic diagram depicting an exemplary system for interactively providing rewards in connection with a transaction conducted at a transaction terminal 100. Briefly, the various components of the system 100 include a transaction computing device 102 (hereinafter referred to as a "transaction terminal"), which is used to conduct payment transactions between consumers (not shown) and merchants (not shown), and an interactive value generator (IVG) 115 that is configured to generate unspecified reward values in connection with the transactions conducted using the transaction terminal 102. Also shown is a remote transaction processing system 105, which is used to process payment transactions between consumers and merchants and can also be used to manage various aspects of the loyalty reward programs as would be understood by those in the art. Also shown is a first-computing device (referred to as the "server") 110, which is configured to facilitate the implementation of the interactive loyalty reward program through coordinated operation of the transaction terminal 102, the interactive value generator 115 and, optionally, the remote transaction processing system 105. As shown, one or more of the devices comprising system 100 can inter-communicate directly or indirectly, for instance, over a communication network 120, which can include, for example and without limitation, a wired or wireless network, such as a telecommunications network, local area network (LAN) or a wide area network (WAN), the Internet and the like.

Typically, a consumer and a merchant conduct a transaction at a point-of-sale (POS) controlled by the merchant. In some instances the point-of-sale is a brick-and-mortar location and, as such, the transaction is conducted using a dedicated point-of-sale terminal. In other instances, the point-of-sale is a virtual environment, such as a merchant's online webstore, and, as such, the transaction can be conducted using a personal computing device connected to the online environment via the network 120. Accordingly, transaction terminal 102 is intended to represent various types of computing devices, including without limitation, a dedicated point-of-sale terminal at a brick-and-mortar merchant location or a personal computing device (e.g., laptop computer, tablet computer or smart phone device and the like) used to conduct transaction via a virtual store and the like.

A consumer typically remits electronic payment to a merchant by providing the merchant with transaction account information, for instance, by presenting a payment card 101 at the transaction terminal 102. A payment card is uniquely linked to a payment transaction account that is maintained by one or more remote computing devices that facilitate the processing of transactions conducted using the payment transaction account, e.g., one or more of the devices comprising the remote transaction processing system 105. A payment card, as referred to herein, can include, for example, credit cards, debit cards and prepaid cards, whether physical or virtual. A debit card is a transaction card issued for a demand deposit account. A credit card is a transaction card issued for a credit card account. A prepaid card is a transaction card issued for a pre-funded account. The term payment card is also is intended to include actual physical cards, as well as any other electronic devices that can store transaction account information, such as, for example, electronic wallets in mobile phones, personal digital assistants (PDAs), and contactless payment key fobs. Alternatively, the consumer's transaction account information necessary to complete a transaction can be manually provided by the consumer at the transaction terminal 102, for instance, by inputting a payment card number using the user interface of the transaction terminal 102.

Although the consumer, as referenced herein, is described as being the holder of the transaction account, a transaction account can be associated with an account holder who is not necessarily the consumer. In addition, the transaction account information can include financial information, such as a payment card account number, the account holder's name, a card verification code, loyalty rewards program data, PINs, and the like.

Moreover, although the consumer is described as remitting payment using a transaction account that can be associated with a loyalty reward program, the consumer's participation in a loyalty reward program can be independent of the consumer's payment transaction accounts that can be used to provide payment to the merchant. For instance, merchants often offer consumers loyalty reward accounts and issue transaction cards that uniquely link to respective consumers' loyalty reward account. Accordingly, a consumer making a purchase from the merchant can provide loyalty reward account information when making a purchase from the merchant, say, by presenting a rewards card at the point-of-sale, so as to accrue loyalty rewards irrespective of the particular payment method used to complete the transaction (e.g., cash, credit card or debit card, etc.). Accordingly, transaction account information that is provided in connection with a transaction conducted using the transaction terminal 102 can include payment transaction account information used to remit payment and, in addition or alternatively, loyalty reward account information that can be tied to the payment transaction account or independent of the payment transaction account.

Remote transaction processing system 105, as depicted in FIG. 1, includes one or more computing devices that are configured to receive information concerning the transactions conducted using the transaction terminal 102 and electronically process the transactions in a manner that would be understood by those skilled in the art. For instance, in the case of a four-party transaction processing system, transaction processing system 105 can include: 1) an acquiring entity computing device 106 operated by an acquiring financial institution ("acquirer"), which is typically the bank associated with the merchant; 2) a payment processor/gateway device 112, which can process transactions on behalf of the merchant and the merchant's acquirer; 3) a payment device network computing device 107 operated by a payment device network, for example, Mastercard International Incorporated of Purchase N.Y.; and 4) an issuing entity computing device 108 operated by an issuing financial institution ("issuer"), which is typically the bank associated with the consumer or transaction account holder's transaction account.

More specifically, in an exemplary four-party payment process, a merchant authorization request message detailing the transaction being conducted at the transaction terminal 102 and payment transaction account details for the consumer is generated by the merchant's computing system and sent to the acquiring entity computing device 106, either directly or via the payment/processor gateway device 112. The authorization request is then forwarded to the issuing entity computing device 108 via the payment device network computing device 107. Upon verifying a status of the consumer's transaction account identified in the authorization request message, the issuing entity computing device 108 responds with an authorization response message that is passed back through one or more of the devices comprising the transaction processing system 105 such that the result (e.g., transaction approved or denied) can be output at the transaction terminal 102.

As previously noted, the exemplary system 100 is provided to encourage desired consumer behavior (e.g., payment card utilization). To this end the system implements a consumer loyalty reward program and adds a dynamic, interactive and fun element to the transaction experience by encouraging consumer interaction with a game-like IVG 115 and generating a seemingly random reward amount for the transaction based on the resulting reward value specified by the IVG. It should be understood that terms "award" and "reward" are used interchangeably herein.

Accordingly, the consumer's payment card and/or the linked transaction account can be associated with a loyalty rewards program that offers the consumer an incentive to use that payment card when making purchases. In some examples of loyalty rewards programs, the program is offered and managed by one or more of the merchant, payment device network, and the issuing entity. For instance, a merchant can issue a brand payment card to a cardholder and agree that when cardholder purchases a prescribed amount of goods from the merchant using the brand payment card, the cardholder receives a certain number of loyalty points that can then be used for prizes or discounts on other purchases. In other examples, an issuing entity can issue a payment card to cardholder and, under the loyalty rewards program, provide the cardholder with a cash reward equal to a percentage of the amount of every purchase cardholder places using the payment card. In such an implementation, the issuing entity computing device 108 monitors a total cost of the purchases that cardholder pays for using the payment card, and determines the amount of money cardholder will be made available to the cardholder as a reward. By way of further example, as noted above, a merchant can issue a machine-readable card that is linked to a consumer's loyalty reward account with the merchant, as opposed to being linked to a payment transaction account. Accordingly, when cardholder purchases goods from the merchant and presents the loyalty reward card, the consumer can receive loyalty rewards points irrespective of the payment method used.

The baseline terms associated with respective loyalty rewards programs are varied and can include, for example and without limitation, a threshold purchase amount required for one or more purchases to be qualified for a reward, a percentage of the qualifying purchase(s) amount that is provided to a consumer as a reward, the particular form or unit of the reward (e.g., cash-back, credit, points), and the corresponding value of the reward. The exemplary system for interactively providing rewards in connection with a transaction conducted at a transaction terminal 100, can be provided to augment or modify existing loyalty rewards programs as well as to provide entirely new reward programs. Moreover, the particular reward value for a transaction, which is interactively generated on-demand in accordance with one or more of the disclosed embodiments further described herein, can be used to adjust any number of different baseline terms for the reward program.

Server 110 depicted in FIG. 1 coordinates implementation of the systems and methods for interactively providing rewards in connection with a transaction conducted at the transaction terminal 102. In particular, server 110 is configured to be in communication via the communications network 120 with the transaction terminal 102 and, in addition or alternatively, the interactive value generator 115. Connectivity to the interactive value generator enhances the operation of the system by interactively providing rewards in connection with a transaction using the transaction terminal 102, as will be described in greater detail below.

The server 110 is also shown independent of and in communication with one or more of the devices that comprise the remote transaction processing system 105. Accordingly, the server 110 and the system for interactively providing rewards can be integrated with any number of different acquirer, issuer, merchant and payment device network systems that provide loyalty reward programs to consumers. However, server 110 or various features and functionality of the server described herein can, in some implementations, be integrated into one or more of the computing devices that comprise the transaction processing system 105 without departing from the scope of the disclosed embodiments.

In order to facilitate operation of the system for interactively providing rewards in connection with a transaction conducted at a transaction terminal 100, preferably, the transaction terminal 102 also includes a user interface and a display (not shown) that, as would be understood in the art of electronic computing devices, serve to facilitate the output of information to consumers and the capture of information from consumers in connection with transactions being conducted at the transaction terminal 102. Preferably, the transaction terminal 102 executes one or more software modules that configure the transaction terminal 102 to communicate/interface with one or more of the computing devices depicted in FIG. 1 thereby preferably initiating, facilitating, maintaining, and/or enhancing the operation of the system for interactively providing rewards in connection with a transaction conducted at a transaction terminal 100.

In particular, the transaction terminal can be provided with a loyalty reward application module comprising instructions in the form of code that, when executed by the transaction terminal's processor (not shown), configures the transaction terminal 102 to, for example and without limitation: guide a consumer's interaction with the interactive value generator 115; receive the unspecified rewards value generated by the interactive value generator 115; and communicate transaction details and rewards value information and the like to the server 110. Transaction terminal 102 can also include additional software and hardware components that configure the transaction terminal to coordinate processing of transactions conducted at the transaction terminal 102 by the remote transaction processing system 105, as would be understood by those in the art. The loyalty reward application can comprise a stand-alone software application executing on the transaction terminal 102 or can be executing on one or more remote server devices that are accessible by the transaction terminal 102 over the communication network 120, for instance, a web-based portal that is accessed through a web browser or other such application.

IVG 115 shown in FIG. 1 is configured to generate an unspecified value as a function of consumer interactions therewith. In some implementations, the IVG 115 is a stand-alone device provided at the transaction terminal such that a consumer can physically interact with the IVG directly. In addition or alternatively, the IVG 115 can include a software module provided at a computing device accessible to the consumer in connection with the transaction. The IVG 115 is described as being configured to generate an "unspecified" value because the rewards values that it generates can vary from one transaction to the next and, in this regard, the rewards awarded to a particular consumer under the loyalty reward program are "variable" across different transactions. Accordingly, the actual reward value that is generated by the IVG 115 for a particular transaction is referred to as a "specified" value in that it is defined/specified for the particular transaction.

In an exemplary stand-alone configuration, the IVG 115 can be configured to resemble a "roulette wheel" provided next to the POS terminal at a merchant's store. In such a configuration, a consumer conducting a transaction at the POS terminal can be prompted to spin the roulette wheel, thereby causing a ball to bounce seemingly randomly (but actually pseudo-randomly based on a seed value) on the wheel before coming to rest at a final location, which also has a corresponding value. Accordingly, the IVG 115 generates the specified reward value for the transaction based on the consumer's interaction with the IVG (i.e., spin of the wheel). More specifically, in some configurations, the IVG 115 can include a processor configured by code implemented therein to determine, based on one or more sensors located within the roulette wheel or other processing of code, a final resting position of the ball within the wheel and a computed, pseudo-random specified value that corresponds to the resting position. Accordingly, using a communication interface, the IVG's processor can transmit the specified value to the transaction terminal 102 over a wired or wireless communication connection established therebetween. In another exemplary configuration, the specified value can be manually input into the transaction terminal 102, for instance, by the merchant's representative at the point of sale.

In implementations where the IVG 115 is provided separately from the transaction terminal 102, for instance as a stand-alone device, the interactive value generator 115 can be in communication with the transaction terminal 102 and configured to automatically transmit the specified reward value to the transaction terminal 102. Accordingly, the transaction terminal 102 can then relay the reward value to the server 110 for further processing. In addition or alternatively, the IVG 115 can be configured to communicate the specified value and information identifying the corresponding transaction to the server 110 via the communication network 120.

The "roulette wheel" configuration is provided as an example and any number of different interactive "games of chance" can be implemented to generate seemingly random values in response to user interactions, in accordance with an aspect of the invention.

In addition or alternatively, the IVG 115 can include a software-based component that is executing on a computing device and configured to electronically generate unspecified reward values for transactions in response to a consumer's interaction received at a user interface of the computing device. Moreover, the software component of the IVG can further configure the computing device to output an interactive and virtualized game-like experience for the consumer using an associated display or output device.

For instance, the IVG 115 can include a software module that is executing on the transaction terminal 102 and that configures the transaction terminal 102 to receive consumer interactions via an associated user interface and that further configures the transaction terminal 102 to output a virtual game-of-chance experience using an associated display. Moreover, in response to an input received from the consumer at the transaction terminal 102, the IVG can generate the specified value using a pseudo-random number generator and display the specified value and other game-play animations on the display of the transaction terminal 102. In such a configuration, the IVG 115 can comprise a stand-alone software application executing on the computing device (e.g., transaction terminal 102) or can be executing on one or more remote server devices that are accessible by the terminal 102 over a network, for instance, a web-based portal that is accessed by the user device through a web browser or other such application.

By way of further example, the IVG 115 can realized using computing devices other than the transaction terminal 102 or a stand-alone device provided therewith. For example and without limitation, IVG 115 can be provided as an application that is executing on or accessible using the consumer's personal smartphone. Accordingly, the IVG 115 need not be physically provided at the point-of-sale, (e.g., virtually via transaction terminal 102 or as a dedicated device provided along-side the transaction terminal 102). For instance, in connection with a transaction conducted at a brick and mortar location using merchant's POS terminal, the consumer can be prompted to interact with a software-based IVG 115 provided on the consumer's personal smartphone to generate a specified rewards value for the transaction, as further described herein.

Although much of the foregoing description has been directed to systems for processing and awarding loyalty rewards in connection with transactions between a consumer and a merchant conducted at a point-of-sale terminal, the particular arrangement of devices, particularly, the transaction terminal 102, the remote transaction processing system 105 and the server 110, as well as the transaction processing steps, are presented as a non-limiting and exemplary environment in which the systems and methods for system for interactively providing rewards in connection with a transaction conducted at a transaction terminal described herein can be employed.

Figure 2:
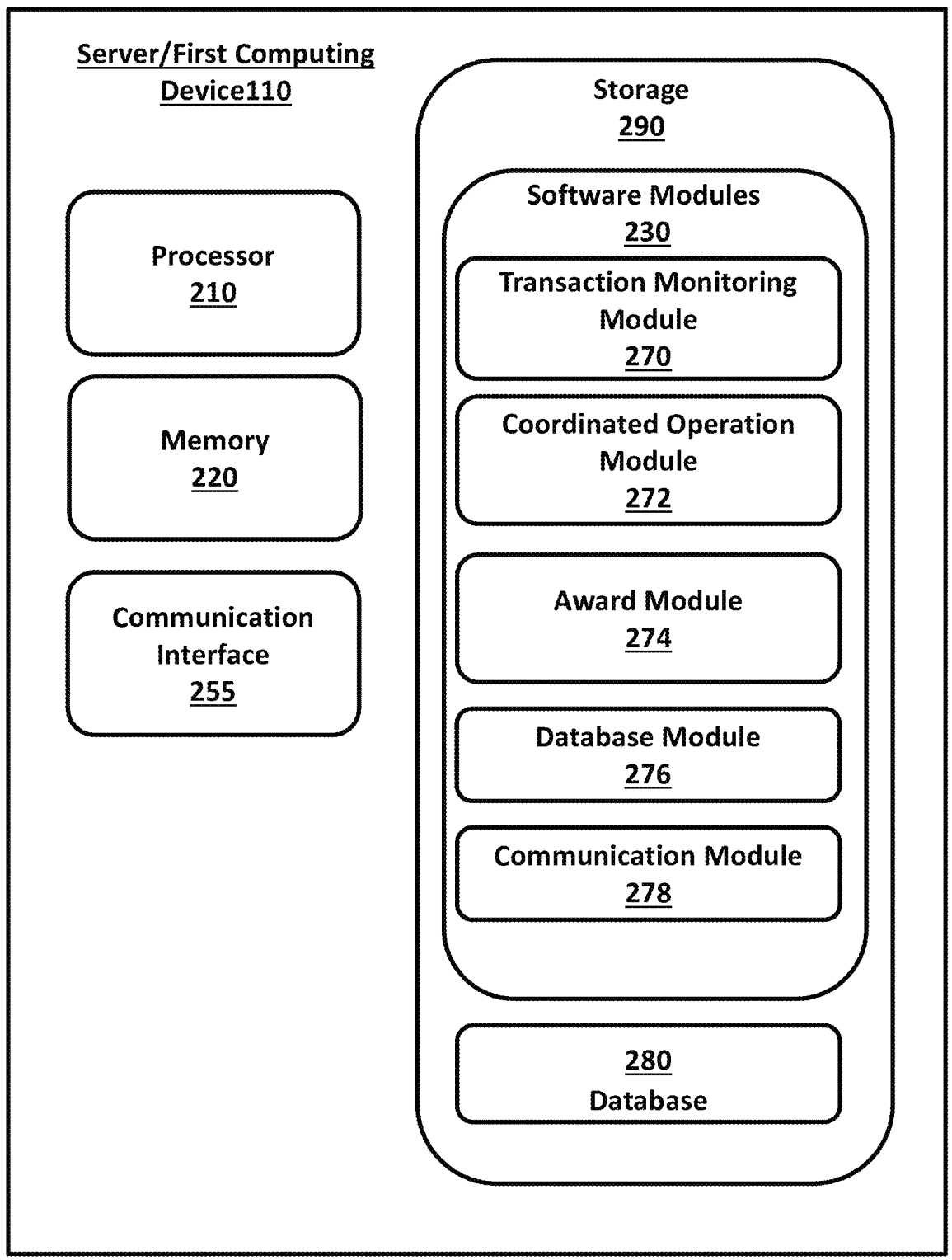
FIG. 2 is a block diagram illustrating an exemplary configuration of a computing device for providing an interactive loyalty reward program in accordance with at least one embodiment disclosed herein.

FIG. 2 is a high-level diagram illustrating an exemplary configuration of the server 110 for use in the system for interactively providing rewards in connection with a transaction conducted at a transaction terminal 100.

Exemplary server 110 includes a processor 210, which is operatively connected to various hardware and software components to enable operation of the systems and methods described herein. The processor 210 implements instructions that perform various operations relating to transactions conducted by a consumer electronically and for interactively providing rewards in connection with a transaction conducted at a transaction terminal. Without loss of generality, the processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable.

The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable. Also preferably stored on the storage 290 is a database 280. As will be described in greater detail below, database 280 contains and/or maintains various data items and elements, such as user profiles, transaction account information, rewards program rules and the like that are utilized throughout the various operations of the system for interactively providing rewards in connection with a transaction conducted at a transaction terminal 100. Accordingly, preferably, at some point prior to using the system for interactively providing rewards in connection with a transaction conducted at a transaction terminal 100, one or more consumers and/or payment transaction accounts are enrolled with the system and necessary information relating to the consumers, transaction accounts and associated loyalty reward programs are stored by the server 110 in the database 280. It should be noted that although the database 280 is depicted as being configured locally to the server 110, in certain implementations the database 280 and/or various of the data elements stored therein can be stored on a computer readable memory or storage medium that is located remotely and connected to the server 110 through a network, in a manner known to those of ordinary skill in the art.

One or more software modules 230 are encoded in the storage 290 and/or in the memory 220. The software modules 230 can comprise one or more software programs or applications having computer program code or a set of instructions executed in the processor 210. Such computer program code or instructions for carrying out operations or aspects of the systems and methods disclosed herein can be written in any combination of one or more programming languages, as would be understood by those skilled in the art.

Preferably, included among the software modules 230 is a transaction monitoring module 270, a coordinated operation module 272 and an award module 274 that are executed by the processor 210. In particular, transaction monitoring module 270 serves to configure the processor 210 to receive, from one or more transaction computing devices over a communication network, transaction data associated with respective transactions and monitor the transaction data for a qualifying transaction under a loyalty reward program managed by server 110. Coordinated operation module 272 serves to configure the processor 210 to, in response to the identification of a qualifying transaction and in conjunction with the application module enabled at the transaction terminal 102, prompt the consumer to interact with the IVG 115 and receive a specified value generated by the IVG. Award module 274 serves to configure the processor 210 to calculate an award amount. In some implementations, the award amount can be calculated entirely based on the specified value generated by the IVG. In addition or alternatively, in some implementations, the award amount can be calculated based on a default value and the specified value generated by the IVG. Moreover, award module 274 further configures the processor 210 to cause the calculated award amount to be provided to the registered user, for instance, in conjunction with any third-party computing systems that maintain or control the provisioning of loyalty rewards to consumers or transaction account holders.

Database module 276 serves to configure the processor 210 to maintain a database of consumer or transaction account information, information identifying one or more loyalty rewards programs associated therewith and any rules or terms associated with respective loyalty reward programs. For instance, the database module 276 enables the processor 210 to verify, using the database, whether a consumer and/or transaction account associated with a transaction is enrolled in a loyalty reward programs having an interactive loyalty reward component managed by the server 110. Moreover, the database module 276 configures the processor 210 to determine, using the database 280, whether the transaction is considered a qualifying transaction under the respective rules and terms of the loyalty reward program thereby facilitating selective operation of the system for interactively providing rewards in connection with a transaction conducted at a transaction terminal 100. Such verifications and determinations as just described are performed to inhibit or activate certain software modules including one or more of modules 270, 272 and 274, the loyalty reward application module provided at the transaction terminal 102 and aspects of the IVG 115. Communication module 278 serves to configure the processor 210 to communicate with various computing devices that comprise the system for interactively providing rewards in connection with a transaction conducted at a transaction terminal 100.

Although software modules 230 are depicted as being stored locally by the server 110, the disclosed embodiments are not so limited, as one or more of the modules can be stored on one or more remote storage mediums that are accessible to the processor 210. The program code can execute entirely on the server 110 as a stand-alone software package, partly on the server 110 and partly on one or more remote computing devices, or entirely on such remote computing devices. In the latter scenario, the remote computing devices can be connected to the server 110 through any type of wired or wireless network (not shown), including a local area network (LAN) or a wide area network (WAN), or the connection can be made to an external computer (for example, through the Internet using an Internet Service Provider). For instance, one or more aspects of the transaction monitoring module 270 can be implemented by the transaction terminal 102 such that the transaction terminal is configured to monitor the transactions conducted at the transaction terminal and determine whether a transaction is a qualifying transaction under a loyalty reward program that is managed using the server 110.

In some embodiments, one or more of the software modules 230 can be downloaded over a network to the storage 290 from another device or system via the communication interface for use within the system 100 for interactively providing rewards in connection with a transaction conducted at a transaction terminal 100. For instance, program code stored in a computer readable storage device in a remote server can be downloaded from the server to the storage 290 over the network.

A communication interface 255 is also operatively connected to the processor 210. The communication interface 255 can be any interface that enables communication between the transaction terminal 102 and external devices, machines and/or elements. In certain implementations, the communication interface 255 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the server 110 to other computing devices and/or communication networks, such as private networks and the Internet. Such connections can include a wired connection or a wireless connection (e.g., using the IEEE 802.11 standard known in the relevant art) though it should be understood that communication interface can be practically any interface that enables communication to/from the processor 210. Accordingly, at various points during the operation of the systems and methods disclosed herein, the server 110 can communicate, directly or indirectly, with one or more of the computing devices that comprise the remote transaction processing system 105, transaction terminal 102 and/or the interactive value generator 115 depicted in FIG. 1.

The operation of the exemplary system for interactively providing rewards in connection with a transaction conducted at a transaction terminal 100 and the various elements and components described above will be further appreciated with reference to the method for interactively providing rewards in connection with a transaction conducted at a transaction terminal described below, in conjunction with FIG. 3.

Several of the logical operations described herein are implemented (1) as a sequence of computer implemented acts or program modules running on the various devices of the system for interactively providing rewards in connection with a transaction conducted at a transaction terminal 100 and/or (2) as interconnected machine logic circuits or circuit modules within the system. The actual implementation is a matter of design choice dependent on the requirements of the device (e.g., size, energy, consumption, performance, etc.). Accordingly, the logical operations described herein are referred to variously as operations, steps, structural devices, acts, or modules. As referenced above, the various operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Figure 3:
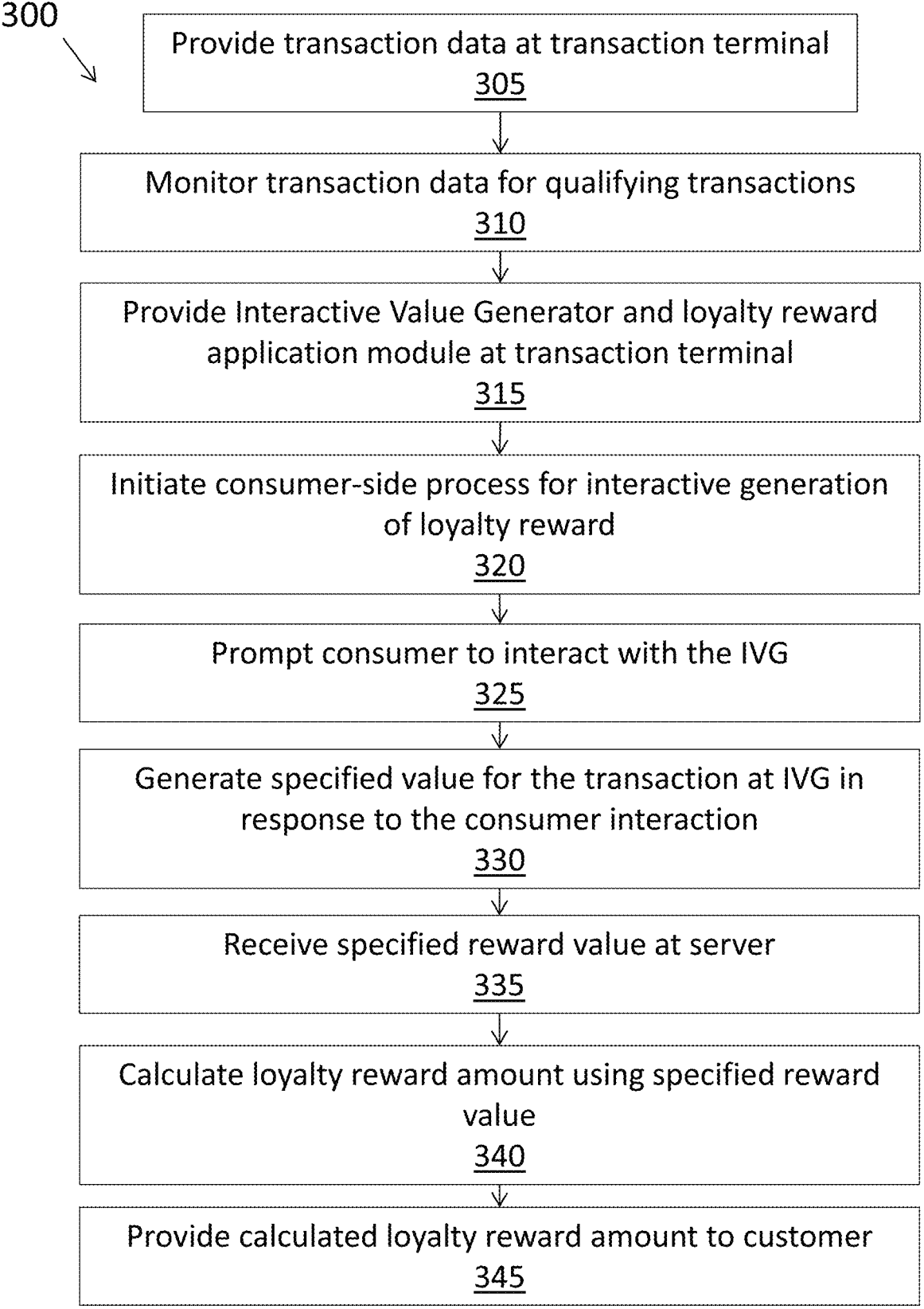
FIG. 3 is a flow diagram showing a method for providing an interactive loyalty reward program in accordance with at least one embodiment disclosed herein.

Turning now to FIG. 3, a flow diagram illustrates a method 300 for interactively providing rewards in connection with a transaction conducted at a transaction terminal in accordance with at least one embodiment disclosed herein.

The process begins at step 305, where transaction data concerning a transaction conducted by the consumer and a merchant is received at the transaction terminal 102. In the context of a payment transaction for the purchase of goods by a consumer from a merchant, the transaction information can include a description of the purchased goods, a price, information identifying the merchant, and the like, as would be understood by those skilled in the art. Transaction data can also include payment transaction account information which, as mentioned above, includes information that is useable to identify the consumer or a payment transaction account used by the consumer. In some instances this information can be read electronically from a payment card presented by the consumer by the transaction terminal 102 using a payment card reader, for instance, a magnetic stripe reader or a NFC chip reader. In addition, non-transaction account information can also be captured from the consumer's payment card while completing the transaction. As mentioned previously, non-transaction account information can include, for example and without limitation, information identifying any loyalty reward programs associated with the consumer or the consumer's payment transaction account.

Then, at step 310, the transaction data is monitored by the server 110 to identify any qualifying transactions under a respective loyalty reward program. Preferably, the system for interactively providing rewards in connection with a transaction conducted at a transaction terminal 100, is deployed at scale and configured to interactively provide loyalty rewards program for a plurality of transactions conducted at any number of respective transaction terminals. Accordingly, the server's processor 210, executing one or more software modules including, preferably, the transaction monitoring module 270 and the communication module 278, can be configured to receive in near-real time and on an ongoing basis, transaction data relating to the plurality of transactions as they are conducted at various transaction terminals. The transaction data can be received over the network from one or more of the transaction terminals (e.g., transaction terminal 102) and any of the devices comprising the remote transaction processing system 105. The particular device of system 100 from which the server 110 receives the transaction data can vary depending on the implementation of the system. For instance, in the case of the server 110 implementing a reward program on behalf of a merchant, the server 110 can receive the transaction data from the merchant's payment processing system (e.g., a dedicated POS device and/or payment processor/gateway device 112). By way of further example, in the case of server 110 implementing a reward program on behalf of an issuing bank, the transaction data can be received from the issuing entity computing device 108.

In one or more implementations, server 110 can be configured to receive the transaction data for a transaction conducted at transaction terminal 102 prior to approval of the transaction. For example, in a typical four-party payment processing scenario, the server can receive the merchant authorization request message transmitted by the merchant's payment processing system (e.g., transaction terminal 102 and/or payment processor/gateway device 112) and, thus, the transaction data for the transaction.

In addition or alternatively, the server 110 can be configured to receive transaction data after the transaction is approved. For instance, in a typical four-party payment processing scenario, the server 110 can be configured to receive an authorization response message generated by the issuing entity computing device 108 for the transaction and that is passed back through one or more of the devices comprising the transaction processing system 105. Accordingly, the transaction data can be received at the server 110 from the transaction terminal 102 and/or one or more of the devices comprising the remote transaction processing system 105.

In addition, at step 310, the processor 210 of server 110, which is executing one or more software modules including, preferably, the transaction monitoring module 270 and the database module 276, can be configured to analyze the transaction data received from the remote transaction terminal 102 in view of the information stored in the database 280 to determine whether the transaction constitutes a "qualifying transaction" under the interactive loyalty reward program coordinated by the server 110.

As noted above, the server 110 has access to a database 280 that contains consumer and rewards program information including, for example and without limitation, information concerning consumers and/or payment transaction accounts that are registered to utilize the systems/services offered by the system for interactively providing rewards in connection with a transaction conducted at a transaction terminal 100. The database can also include information concerning any reward programs that are associated with the registered consumer or payment transaction accounts. The reward program information can include specific rules and terms that govern the manner in which rewards are awarded to consumers for qualifying transactions.

Accordingly, the configured processor 210 of server 110 can identify from the payment transaction data a consumer and/or transaction account associated with the transaction conducted at transaction terminal 102. This information can be compared against the information in the database 280 to determine whether the consumer or the transaction account is registered and associated with a loyalty reward program managed at least in part by the server 110. If the transaction concerns a registered user or transaction account, the configured processor can further analyze the particular details of the transaction in view of one or more prescribed rules and terms associated with a loyalty reward program to determine whether the transaction is a qualifying transaction. For example, the configured processor 210 can determine whether the amount of the transaction meets or exceeds a prescribed minimum purchase amount threshold associated with the loyalty reward program. By way of further example, the server can determine whether the transaction is for the purchase of certain types of goods (e.g., food or clothing) or from a particular merchant in accordance with the prescribed terms of the loyalty reward program. Provided that the configured processor 210 of server 110 determines that the transaction is a qualifying transaction, the configured processor 210 can enable the interactive generation of an unspecified reward value in connection with the transaction for the benefit of the consumer using the system components described herein.

The inventors perceive that it is desirable to prevent customers from knowing the generated reward value for a transaction before the customer commits to completing the transaction. This can help to limit abuse, for example, by customers who only would perform a transaction if the specified reward value is higher than a baseline reward value under the reward program. Accordingly, in one or more implementations, the determination that a transaction is a qualifying transaction by the server 110 and/or the advancement of the interactive generation of the unspecified reward value component at the transaction terminal 102 can be contingent upon the transaction being approved. Other protocols can be implemented to prevent abuse. For instance, the interactive generation of the reward value can be commenced at the transaction terminal 102 after the consumer commits to the transaction (e.g., after the merchant authorization request message is transmitted to the remote transaction processing system 105) yet before the transaction is approved. In such an implementation, the ultimate award of any reward value for the transaction can be contingent upon transaction approval. Performing the interactive generation of the reward value steps while the transaction is processed can result in a quicker overall process.

It should be appreciated that, in addition or alternatively, one or more of the steps for identifying a qualifying transaction can be conducted by the transaction terminal 102, thereby avoiding reliance on the server 110 when identifying a qualifying transaction that prompts interactive generation of an unspecified reward value as further described herein.

At step 315, the interactive value generator 115 is provided such that it can be interacted with by the consumer conducting the transaction at the transaction terminal 102. As previously noted, the IVG 115 is configured to, based on consumer interactions therewith, generate unspecified and pseudo-random reward values for transactions. The reward value specified by the IVG 115 for a respective transaction is ultimately used to calculate a specific award amount for the consumer, as further described herein.

Preferably, the IVG 115 is provided at the transaction terminal 102 such that the user can interactively generate a rewards value around the time that the transaction is conducted. As previously noted, in one or more exemplary implementations, the IVG 115 can be a device that is physically provided at a merchant location where the transaction terminal 102 is located and used to conduct the transaction. In addition or alternatively, the IVG 115 can comprise a software module that is provided at a computing device accessible to the consumer. For instance, in such a software-based configuration, the IVG module can be executed by the transaction terminal 102. In another exemplary configuration, a software-based IVG module can also be provided at a computing device separate from the transaction terminal 102, for instance, as an application running on the consumer's personal computing device, such as a smartphone.

In an exemplary stand-alone physical configuration, the IVG can be provided at the transaction terminal 102 prior to the transaction. Similarly, in an exemplary software-based configuration, the IVG 115 can be a previously downloaded application electronically provided by the server 110 to the transaction terminal 102 or the consumer's smartphone over the network 120. In addition or alternatively, the IVG 115 can be dynamically provided by the system server 110 to the transaction terminal 102 or consumer's smartphone on-demand upon identifying a qualifying transaction. Similarly, any pre-downloaded software-based component of the IVG 115, can be turned on or otherwise transitioned into an active mode in response to the identification of a qualifying transaction being conducted at the transaction terminal 102, as further described herein.

Similarly, at step 315, a loyalty reward application module is provided at the transaction terminal 102. As previously noted, the loyalty reward application module executing on the transaction terminal 102 is configured to communicate information concerning consumers, transactions and the like that is captured at the transaction terminal 102 to the server 110. The loyalty reward application can also be configured to prompt or guide a consumer's interaction with the interactive value generator 115 using an associated output device of the transaction terminal 102. In addition, the loyalty reward application can also be configured to receive the specified reward values generated by the interactive value generator 115 such that the specified reward values can be transmitted to server 110 for further processing.

Like the software-based components of the IVG 115, the loyalty reward application module can be electronically provided by the server 110 to the transaction terminal 102 over the network 120 as a software module downloaded prior to the transaction. In addition or alternatively one or more aspects of the loyalty reward application module can be downloaded to or otherwise presented using the transaction terminal 102 in an on-demand fashion, for instance, upon the identification of a qualifying transaction at step 310.

At step 320, the process for interactively generating a loyalty reward is initiated in response to determining that the transaction is a qualified transaction at step 310 and, optionally, is approved. More specifically, the processor 210, which is executing one or more of the software modules 230 including, preferably, the coordinated operation module 272, can be configured to transmit a notification to the transaction terminal 102 that causes the loyalty reward application module to facilitate the interactive generation of a reward value. The notification can include information identifying the transaction such that any generated reward value can be associated with the transaction. The notification can also provide an indication that the transaction is a qualifying transaction and/or has been approved. The notification can also include additional information that is useable to guide the consumer-side process for generating the reward value. Moreover, the notification can include specific instructions specifying a particular manner in which the reward value is generated under the particular loyalty reward program.

In one or more exemplary implementations, the notification can be configured to selectively enable the loyalty reward application module at the transaction device 102 in connection with the transaction. For instance, the notification can trigger execution of the loyalty reward application by the transaction terminal 102. In addition or alternatively, the notification can transition the application from an inactive state to an active state or unlock certain features or functionality of a loyalty reward application. By way of further example, the notification can also provide a link to a hosted virtualized instance of the IVG 115 that is specifically provided for generating a loyalty reward value for the transaction.

Initiating the consumer-side interactive reward value generation process can also include selectively activating the IVG 115. More specifically, in an exemplary implementation, the loyalty reward application executing on the transaction terminal 102 can be configured to transmit instructions to an IVG 115 communicatively coupled thereto. The instructions can be provided to the IVG 115 in response to receipt of the notification from the server 110 and can serve to unlock the IVG such that it can be used to interactively generate the reward value for the transaction. For instance, in the case of a software-based IVG 115 executing on the transaction terminal 102, the loyalty reward application can communicate virtually with the IVG module to coordinate its operation. In the case of a stand-alone IVG 115 configured to be in electronic communication with the transaction terminal 102, the instructions can be communicated over a wired or wireless connection between the IVG 115 and the transaction terminal.

In some implementations, initiating the IVG 115 can also include creating, by the server 110, a hosted virtualized instance of the IVG 115 for the transaction that, as mentioned above, can be transmitted to the transaction terminal 102.

In addition or alternatively, the server 110 can transmit a message over the network 120 to the IVG 115 that unlocks or otherwise initiates the IVG 115 for use in connection with the qualifying transaction. For example, the server 110 processor 210, which is configured by executing one or more of the software modules including, preferably, the coordinated operation module 272 and the communication module 278, can transmit such a message to the stand-alone IVG 115. By way of further example, the configured processor 210 can transmit the message directly to the consumer's smartphone so as to prompt a software-based IVG 115 application on the smartphone to continue the interactive generation of the reward value. The particular address used for transmitting a message to the smartphone over the network 120 can be determined by the configured processor 210 by cross referencing the transaction data with one or more consumer profiles in the database 280 that includes such contact information. As will be appreciated, in implementations in which the user continues interaction through his or her smartphone, such action by the user can be completed asynchronously relative to the purchase transaction. For instance, the user can interact with the application an hour later, a day later, etc.

Then at step 325, the user is prompted to interact with the IVG 115. In an exemplary implementation, the transaction terminal 102 executing the loyalty reward application can be configured to output a prompt using an associated visual or audio output device that instructs the consumer to interact with the IVG 115.

For example, the prompt can instruct the consumer to spin the stand-alone device (e.g., roulette wheel) that is provided on location with the transaction terminal 102. By way of further example, outputting the prompt can include displaying a virtualized game-of-chance experience on a display and further instructing the consumer to interact with the user interface of the transaction terminal 102. Similarly, the prompt and virtual experience can be presented on the consumer's smartphone and instructing the consumer to provide an input using the smartphone (e.g., instructions to shake the smartphone).

Then at step 330, the IVG 115 generates a specified value for the transaction in response to the consumer interaction. As noted in the description of the IVG 115 provided in relation to FIG. 1, the specified value can be generated or otherwise determined for the transaction in a variety of ways. For instance, in a stand-alone physical device configuration, the specified value is determined from the IVG 115 based on where a ball lands on the physical roulette wheel in response to the consumer's spin of the wheel. By way of further example, in a software based configuration, the IVG 115 includes an "engine" that can pseudo-randomly generates the specified value in response to the consumer's input provided to the IVG.

Then at step 335, the specified reward value generated by the IVG 115 is received at the server 110. More specifically, the server 110 processor 210, which is configured by executing one or more of the software modules 230, including, preferably, communication module 278, can be configured to receive the specified reward value from the transaction terminal 102.

In an exemplary configuration, the IVG 115 can be configured to transmit the specified value to the transaction terminal 102 executing the reward application module over a wired or wireless communication connection established there-between. In another exemplary configuration, the specified value defined by the IVG 115 can be manually input into the transaction terminal 102, for instance, by the merchant's representative at the point of sale. Accordingly, the transaction terminal 102 executing the award module 274 can be configured to transmit the generated specified reward value to the server 110 for further processing.

In addition or alternatively, the specified reward value can be provided by the IVG 115 directly to the server 110. For instance, a software-based IVG 115 executing on a stand-alone device or the consumer's smartphone can be configured transmit the generated specified reward value to the server over the communication network 120. By way of further example, in instances where the IVG is a virtualized instance presented at the transaction terminal 102 (e.g., hosted by the server 110 or another server device), the specified reward value generated by the IVG can be provided directly to the server 110 by such hosting device.

Then at step 340, the server 110 calculates a loyalty reward amount for the transaction using the received specified reward value. More specifically, the server 110 processor 210, which is configured by executing one or more of the software modules 230, including, preferably, the award module 274 and the database module 276, can be configured to identify from the database 280 the particular terms and rules for the loyalty reward program that is associated with the qualifying transaction. Based on the identified terms and rules, the configured processor 220 can calculate a reward amount as a function of the specified reward value generated by the IVG 115.

For example and without limitation, the terms can specify a default reward value, say, a baseline percentage or multiplier that is used for determining the minimum reward amount that can be awarded to the consumer for conducting the transaction under the loyalty reward program. The rules can also define how the specified loyalty reward amount is used as a variable in the calculation of the actual reward amount. For instance, the rules can specify that the specified reward value is a percentage by which the minimum reward amount is adjusted when calculating the actual reward amount.

Then at step 345, the server 110 causes the calculated loyalty reward amount to be provided to the customer. As previously mentioned, the loyalty reward program can be maintained by the server 110 or other parties to the transaction, for instance, the merchant, the issuer and the like. Accordingly, the server 110 processor 210, which is configured by executing one or more of the software modules 230, including, preferably, the award module 274 and the communication module 278 and the database module 276, can be configured to record the actual reward amount in the consumer's loyalty reward account record. For instance, the configured processor 210 can store the actual reward amount in the consumer's profile stored in the database 280. In addition or alternatively, the actual reward amount and other consumer or transaction details can be transmitted to one or more of the devices of remote transaction processing system 105. Accordingly, the actual reward amount for the transaction can be recorded by a third-party manager of the loyalty reward program (e.g., the merchant, issuer, acquirer, or the payment device network). In addition, the specified reward value and/or the actual reward amount can also be output to the consumer, say, at the transaction terminal 102, so as to notify the consumer of the rewards accrued and thereby enhancing the consumer's purchasing experience. It can be appreciated that the particular form and amount/value of the reward can vary depending on the particular implementation of the system for interactively providing rewards 100 without departing from the scope of the disclosed embodiments. For instance, the award can be defined as a dollar amount, a percentage of a value associated with one or more transactions, a number of redeemable rewards points and the like.

At this juncture, it should be noted that although much of the foregoing description has been directed to systems and methods for interactively providing loyalty rewards in connection with purchase transactions conducted at a transaction terminal, the systems and methods disclosed herein can be similarly deployed and/or implemented in scenarios, situations, and settings beyond the referenced scenarios. It can be readily appreciated that system 100 can be effectively employed in practically any scenario where a transaction is conducted at a transaction computing device and there is a desire to interactively provide unspecified value in connection with the transaction and based on user interaction at the point of the transaction. It can be also appreciated that the arrangement of computing devices and transaction processing steps can vary according to the particular type of transaction (e.g., bank transaction, credit card, debit card, pre-paid card, NFC payment, a reservation, subscription or other arrangement established between two parties and the like).

It is to be understood that like numerals in the drawings represent like elements through the several figures, and that not all components and/or steps described and illustrated with reference to the figures are required for all embodiments or arrangements. Thus, illustrative embodiments and arrangements of the present systems and methods provide a computer implemented method, computer system, and computer program product for interactively providing rewards in connection with a transaction conducted at a transaction terminal. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A system for providing unspecified value in connection with a transaction conducted at a transaction computing device, wherein the unspecified value is a pseudo-randomly calculated award amount, the system comprising:

an interactive value generator, wherein the interactive value generator is a device provided at a location of the particular transaction computing device, is separate from the particular transaction computing device, and is in electronic communication with the particular transaction computing device, and wherein the interactive value generator is configured to receive user interactions and pseudo-randomly generate values that are specified for respective transactions as a function of respective user interactions with the interactive value generator and communicate the pseudo-randomly generated values to the particular transaction computing device;

an application module enabled at a particular transaction computing device, wherein the particular transaction computing device is communicatively coupled to a remote first computing device over a communication network, and wherein the application module configures the particular transaction computing device to guide the user interactions with the interactive value generator and to communicate a specified value of the pseudo-randomly generated values received from the interactive value generator to the first computing device; and the first computing device having a memory storing one or more software modules comprising instructions in the form of code and a processor configured by executing the instructions therein, wherein the one or more software modules include:

a transaction monitoring module that configures the processor to receive, from one or more transaction computing devices over a communication network, transaction data associated with respective transactions and monitor the transaction data for a qualifying transaction, wherein the qualifying transaction is conducted at the particular transaction computing device by a registered user, a coordinated operation module that configures the processor to, in response to the qualifying transaction and in conjunction with the particular transaction computing device enabled by the application module, prompt the registered user to interact with the interactive value generator provided at the particular transaction computing device and receive, from the particular transaction computing device, the specified value pseudo-randomly generated by the interactive value generator for the qualifying transaction in response to the registered user's interaction with the interactive value generator, and an award module that configures the processor to calculate an award amount as a function of a default value and the received specified value and cause the calculated award amount to be provided to the registered user.

2. The system of claim 1, wherein the interactive value generator is configured to generate the specified value by operation of a pseudo-random number generator as a function of the user interaction being an input to the pseudo-random number generator.

3. The system of claim 1, wherein the interactive value generator is operable in connection with the qualifying transaction after confirmation that the qualifying transaction is authorized is received at one or more of the first computing device and the transaction computing device.

4. The system of claim 1, wherein the coordinated operation module further configures the first computing device processor to receive, from one or more remote transaction processing systems, confirmation that the qualifying transaction was authorized and, based on the received confirmation, enable the application module at the particular transaction computing device to prompt the registered user to interact with the interactive value generator.

5. The system of claim 1, further comprising:
a database storing a list of registered users accessible to the first computing device; and
wherein the transaction monitoring module configures the first computing device processor to analyze the transaction data in view of the list of registered users to identify the qualifying transaction.

6. The system of claim 1, wherein the award module configures the first computing device processor to validate the received specified value according to one or more validation rules and calculate the award amount based on the validation.

7. The system of claim 6, wherein the application module is configured to provide a transaction identifier in association with the specified value to the first computing device; and
wherein the first computing device processor is configured to confirm that the received transaction identifier corresponds to a transaction identifier associated with the qualifying transaction.

8. The system of claim 1, wherein the particular transaction is a financial transaction conducted using the particular transaction computing device at one or more of: a brick and mortar merchant location and a virtual storefront.

9. A computer-implemented method for providing an interactive loyalty reward program in connection with one or more financial transactions conducted by respective consumers using respective transaction computing devices, the method being implemented by a first computing device having a memory storing instructions in the form of code and a processor configured by executing the instructions therein, the method comprising:

receiving, by the first computing device from one or more remote transaction computing devices over a communication network, financial transaction data associated with the one or more financial transactions;

monitoring, by the first computing device, the financial transaction data to identify a qualifying transaction, wherein the qualifying transaction is conducted by a registered consumer and using a particular transaction computing device;

providing, at the particular transaction computing device, an interactive value generator that is configured to receive consumer interactions and pseudo-randomly generate reward values as a function of respective consumer interactions with the interactive value generator and provide the generated rewards values to the particular transaction computing device, wherein the interactive value generator is a device that is separate from the particular transaction computing device and is in electronic communication with the transaction computing device;

enabling at the particular transaction computing device, a loyalty reward application module, wherein the loyalty reward application module configures the particular transaction computing device to communicate with the first computing device over the communication network and to guide consumer interactions with the interactive value generator and to communicate a specified value of the pseudo-randomly generated value received from the interactive value generator to the first computing device;

prompting, at the particular transaction computing device using the loyalty reward application module in response to the first computing device identifying the qualifying transaction, the registered consumer to interact with the interactive value generator provided at the particular transaction computing device;

receiving, at the first computing device from the particular transaction computing device, the specified reward value pseudo-randomly generated by the interactive value generator for the qualifying transaction in response to the registered consumer's interaction with the interactive value generator;

calculating, by the first computing device, a loyalty reward amount as a function of a default reward value and the received specified reward value; and causing, by the first computing device, the calculated loyalty reward amount to be provided to the registered customer.

10. The method of claim 9, wherein the loyalty reward value receiving step receives the loyalty reward value as a result of operation of a pseudo-random number generator as a function of the consumer interaction being an input to the pseudo-random number generator.

11. The method of claim 9, wherein the interactive value generator is operable in connection with the qualifying transaction only after authorization of the qualifying transaction.

12. The method of claim 9, further comprising:
receiving at the first computing device from one or more remote transaction processing systems, confirmation that the qualifying transaction was approved; and
performing the step of prompting the registered consumer in response to the received confirmation.

13. The method of claim 12, further comprising:
enabling, by the first computing device in response to the received confirmation, one or more of the loyalty reward application and the interactive value generator.

14. The method of claim 13, further comprising:
receiving, at the first computing device, a transaction identifier associated with the received specified reward value; and
confirming, with the first computing device, that the received transaction identifier corresponds to a transaction identifier associated with the qualifying transaction; and
validating the received reward value based on the confirming step.

15. The method of claim 9, further comprising:
verifying, by the first computing device, that the received reward value was validly generated according to one or more validation rules; and
wherein the loyalty reward amount is calculated as a function of the specified reward value based on the verifying step.

16. The method of claim 9, wherein the qualifying transaction is conducted using the particular transaction computing device at one or more of: a brick and mortar merchant location and a virtual storefront.

17. A system for providing an interactive loyalty reward program in connection with one or more financial transactions conducted by respective consumers using respective transaction computing devices, the system comprising:
an interactive value generator provided at a particular transaction computing device, wherein the interactive value generator is configured to receive user interactions and pseudo-randomly generate reward values for respective transactions as a function of respective consumer interactions with the interactive value generator, and wherein the interactive value generator is a device that is physically separate from the particular transaction computing device and is communicatively coupled to the transaction computing device and is configured to electronically communicate the generated reward values to the particular transaction computing device;
a loyalty reward application module enabled at the particular transaction computing device which is communicatively coupled to a remote first computing device over a communication network, and wherein the loyalty reward application module configures the particular transaction computing device to guide the consumer interactions with the interactive value generator pursuant to the interactive loyalty reward program and to receive the generated reward values from the interactive value generator and electronically communicate the generated reward values to the first computing device; and
the first computing device having a memory storing one or more software modules comprising instructions in the form of code and a processor configured by executing the instructions therein, wherein the one or more software modules include:
a transaction monitoring module that configures the processor to receive, from one or more transaction computing devices over a communication network, financial transaction data associated with the one or more financial transactions and monitor the financial transaction data for a qualifying transaction, wherein the qualifying transaction is conducted by a registered consumer and using a particular transaction computing device,
a coordinated operation module that configures the processor to, in response to the qualifying transaction and in conjunction with the particular transaction computing device enabled by the loyalty reward application module, prompt the registered consumer to interact with the interactive value generator provided at the particular transaction computing device and, wherein the device coordination module further configures the processor to receive, from the particular transaction computing device, a specified reward value of the pseudo-randomly generated reward values generated by the interactive value generator for the qualifying transaction in response to the registered consumer's interaction with the interactive value generator, and
a loyalty reward module that configures the processor to calculate a loyalty reward amount as a function of a default reward value and the received specified reward value and cause the calculated loyalty reward amount to be provided to the registered customer.

\* \* \* \* \*